C. H. COCHRANE.
MEANS FOR CONTROLLING THE FLOW OF FLUIDS.
APPLICATION FILED MAR. 17, 1921.

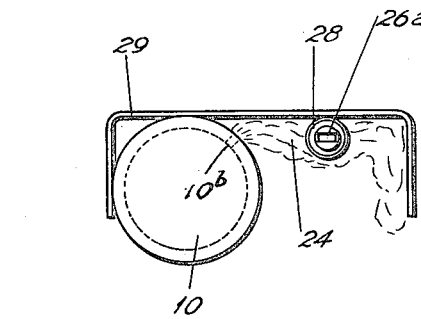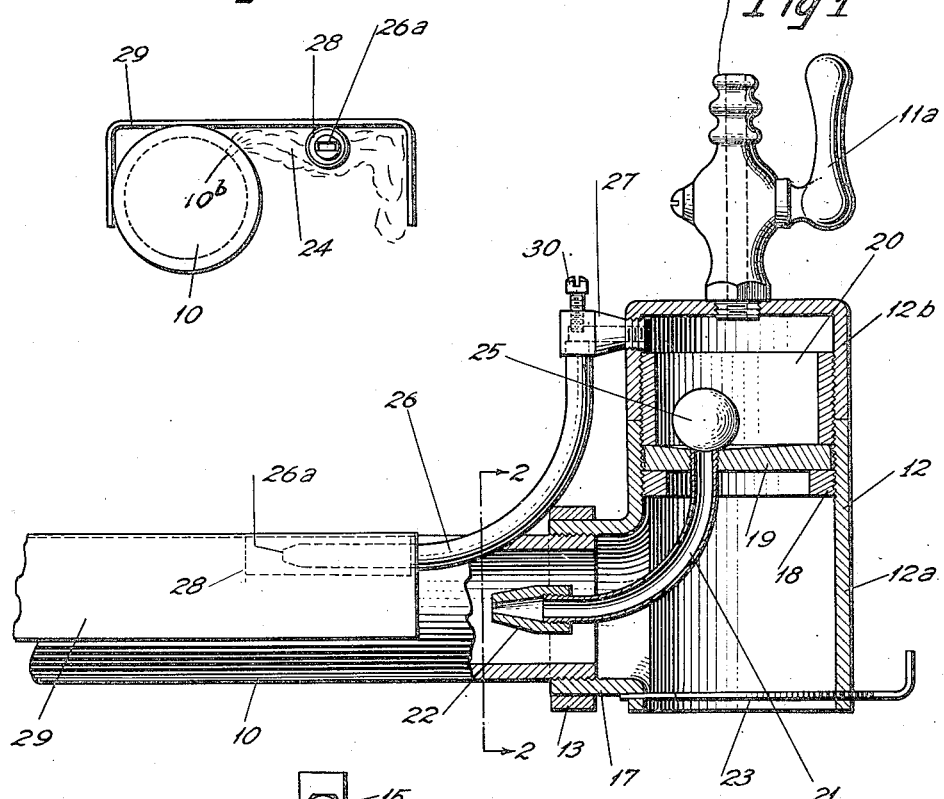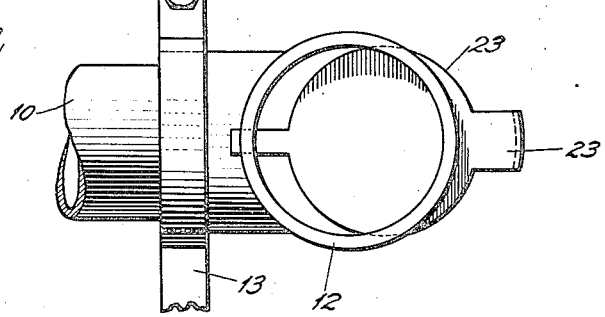

INVENTOR
Charles H Cochrane

BY
ATTORNEYS

UNITED STATES PATENT OFFICE.

CHARLES H. COCHRANE, OF NEW YORK, N. Y.

MEANS FOR CONTROLLING THE FLOW OF FLUIDS.

1,423,831.        Specification of Letters Patent.      Patented July 25, 1922.

Application filed March 17, 1921. Serial No. 453,007.

*To all whom it may concern:*

Be it known that CHARLES H. COCHRANE, a citizen of the United States of America, and resident of New York city, in the county of New York and State of New York, has invented certain new and useful Improvements in Means for Controlling the Flow of Fluids, of which the following is a specification.

This invention relates to means for controlling the flow of fluids, and while adapted for broad application generally, is specifically designed for use in controlling the flow of gas to the heaters and demagnetizers of printing presses.

The prime object of the invention is to provide means of this character so constructed that it will not become ineffective through wear, but will operate to effectually control the flow of fluid through long periods of use and even though the parts of the construction are badly worn.

A further and important feature is to provide fluid controlling means operable by vibration to seal or unseal a passage or duct through which the fluid is adapted to flow.

The advantage of such a construction is that, because of these characteristics, it may be efficiently employed to control the feed of gas to a printing press, in which event the vibration, resulting from the operation of a press, will effect the flow of gas, while the press is in operation, while the stopping of the press and consequent cessation of vibration will result in the automatic shutting off of the flow of gas.

The present invention when used in this environment may be employed after the manner described in my copending application filed November 25th, 1918, Serial No. 163,960.

In one practical embodiment of the invention, the means for controlling the flow of fluid embodies a spherical ball forming the sealing member adapted to be normally under the influence of gravity to seal a port, but operable, when vibration is imparted to the valve casing, of which said port forms a part, to be unseated for the purpose of allowing fluid to flow through the port. In such a construction, the cessation of vibration will place the ball under the exclusive power of gravity which will effect an automatic reseating of the ball and an immediate shut off of the flow of fluid.

In another and modified practical form of construction, a valve of any well known type is electrically operated, while an electric operating circuit is controlled through a globular member in the form of a globule of mercury or other conductive material, which, when the apparatus is at rest, automatically takes a position, under the force of gravity, to complete the operating circuit and effect an operation of the valve in one direction, whereas when the apparatus is vibrated the mercury globule is set in motion, the circuit is broken and the valve is operated in another direction.

In both forms of the invention referred to, which are, manifestly, not the exclusive forms which the invention may take, a controlling member of globular form is employed. In the first instance, this member is in the form of a globe or spherical ball, while in the second instance, said member is in the form of a globule of mercury or other conductive material.

Both forms of the invention referred to operate upon the same fundamental principle of the overbalancing of the force of gravity by vibratory force, while the apparatus is in operation, and, conversely, by the overbalancing of gravity through the diminishing or cessation of the vibratory force, when the apparatus is brought to rest.

Marked advantages of any construction made in accordance with the present invention are its absolute reliability and the failure of wear to in anywise affect the proper operation of the apparatus.

Features of the invention, other than those adverted to, will be apparent from the hereinafter detailed description and claims, when read in conjunction with the accompanying drawings.

The accompanying drawings illustrate different practical embodiments of the present invention, but the constructions therein shown are to be understood as illustrative only, and not as defining the limits of the invention.

Figure 1 shows the present invention as associated with a burner, parts of the mechanism shown being illustrated in central section and other parts thereof in elevation.

Figure 3 is an end view of the burner and pilot light shown in Figure 1, as viewed from the left hand end thereof.

Figure 4 is an underneath view of the structure shown in Figure 1; and,

For the purpose of concrete illustration, I have shown the present invention, in the accompanying drawings, as associated with the heater burner of a printing press after the same general manner disclosed in my copending application aforesaid, but it will be understood that this showing is made for the purpose of illustration, only, and is not intended to restrict the present invention to any specific environment.

Considering the construction shown in Figures 1-4 in the environment specified, 10 designates the burner of the gas heater and 11 designates a cock through which gas is fed on its way to the burner. Both the burner 10 and the cock 11 are mounted on a casing 12, the burner 10 being threaded into a boss 17 on the casing 12, so as to extend in a lateral direction therefrom, while the cock 11 is threaded into the top of the casing.

Figure 2:
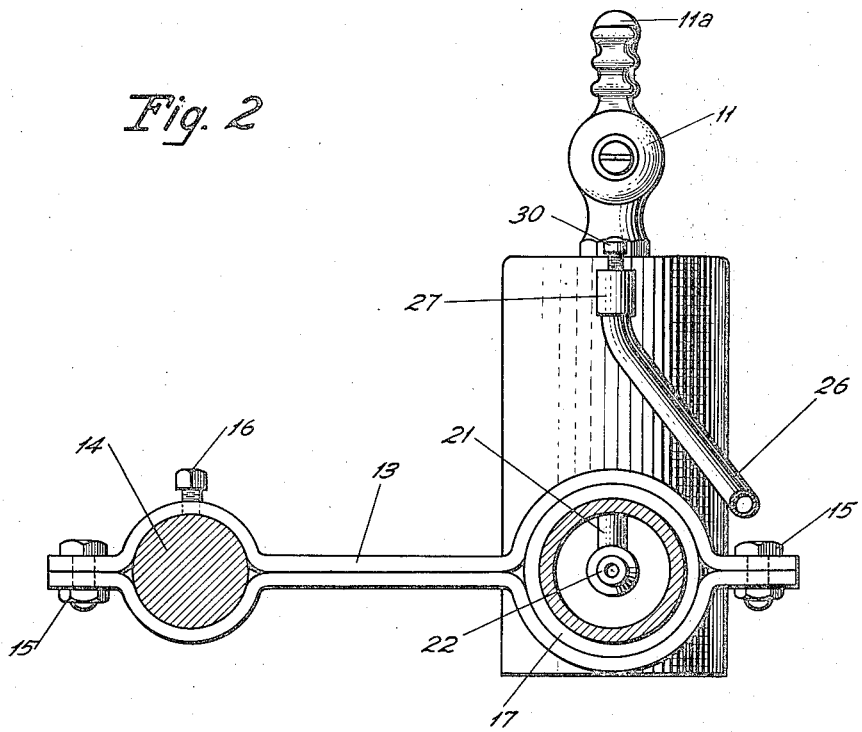
Figure 2 is a section on the line 2—2 of Figure 1.

The casing 12 is adapted, in turn, to be supported in any suitable manner on some vibratory part of the mechanism with which it is associated and, as the present showing illustrates the invention in conjunction with the heating mechanism of a printing press, the casing 12 is shown as mounted by means of a bracket 13 to the front bar 14 of the delivery carriage of the press. The bracket 13 may partake of any desired form, but, as shown in Figure 2, embodies two opposed clamping plates, which are clamped together so as to embrace the bar 14 and the boss 17 of the casing 12 and are maintained in this position by means of bolts 15. The bracket 13 is precluded from turning on the bar 14 by a set screw 16. With this construction, it will appear that the casing 12 and burner are carried by a vibratory part 14 of the press and partake of the same vibratory movement as said bar.

The casing 12, as shown, is formed of two parts, a lower part 12$^a$ and an upper part 12$^b$. The interior of the upper portion of the part 12$^a$ and the interior of the lower part of the upper portion 12$^b$ are screw threaded as shown in Figure 1 to provide valvular means interiorly of said casing.

In assembling the device, this means is included therein by first screwing a ring 18 into the upper open end of the lower portion 12$^a$. A partition 19 is next dropped loosely in on top of the ring 18 and thereafter a tubular portion 20 is screwed down tight on the partition 19 to clamp said partition firmly between the ring 18 and the lower end of the tubular portion 20. The upper or cover portion 12$^b$ is then threaded on to the tubular portion 20 until the lower edge of the upper portion 12$^b$ comes to a seat on the upper edge of the lower portion 12$^a$. All this will be clearly seen from Figure 1.

The partition 19 is provided with a tapped hole into which is screwed at one end an injector pipe 21, which pipe is curved as shown in Figure 1, so that its opposite end enters the burner 10 and is therein provided with an injector tip 22. Gas entering the burner 10 is required to pass from the cock 11, through the upper portion 12$^b$ of the casing and through the pipe 21 to issue from the tip 22 within the burner.

It will be noted that the lower end of the lower portion 12$^a$ of the casing is normally closed or partially closed by a regulating slide 23, which may be manipulated to allow of the entrance of air into the lower portion 12$^a$ of the casing, and the rapid passage of gas through the pipe 21 and out of the tip 22 will cause air to be sucked in through the lower portion of the casing and mixed with the gas issuing from the tip 22 to properly support combustion. The amount of air can, manifestly, be regulated through the manipulation of the slide 23.

The gas does not burn within the burner 10, but said burner is provided with small perforations 10$^b$, through which the combustible mixture of air and gas passes and burns exteriorly of the burner in a flame 24, as shown in Figure 3.

As hereinbefore stated, the flow of gas to the burner is controlled, in accordance with this invention by the vibration of the apparatus and to this end, the upper face of the partition 19 is so configurated that all portions thereof slope toward the inlet end of the pipe 21, and upon the face of this partition is adapted to rest a globular member here shown as a spherical ball 25.

The apparatus is set up in such a manner that the partition will occupy a horizontal position and as a result of these considerations, the ball 25 will normally gravitate to a seat on the inlet end of the pipe 21 which is so ground that when the ball is seated thereon an effective seal will be produced to preclude the passage of gas through the pipe 21. This seal will prevail so long as the apparatus is in a state of rest, but it will be apparent that if the apparatus is sharply vibrated, in lateral direction, that the ball will manifestly become unseated and will oscillate or roll idly about the margin of the partition 19, and interior of the tubular member 20, taking at all times, such position as to fully unseal the inlet to the pipe with the result that gas is free to flow through the pipe 21 to supply the burner. However, as soon as the vibration ceases, the force of gravity will predominate and the ball will come to rest in a position to seal the pipe 21.

By this construction, the feed of fuel is so controlled that when the press is operated, gas will be fed to the burner 10, but as the press slows down and stops the ball will become seated and the gas shut off.

It may be here noted, that any wear to which the ball 25 is subjected will naturally be uniformly distributed throughout the ball and consequently will not result in its failure to effectually seal the inlet end of the pipe 21.

Preferably associated with the device is a pilot tube 26 which is at all times in communication with the interior of the casing 12$^b$, above the partition 19 through a connection 27 and this tube extends into proximity with the burner 10, its outlet end 26$^a$ being in the form of a burner tip adapted to furnish a pilot light, which when once lighted serves to light the burner when the gas is turned on without the employment of extraneous means, such as matches or the like. The outlet end 26$^a$ of the pilot tube is preferably housed within a cylindrical sleeve 28 to facilitate air mixing for the pilot light and a shield 29 preferably overlies both the burner 10 and sleeve 28 after the manner shown in Figure 3 to deflect the heat of the burner downwardly upon the paper passing through the press, all as well understood in the art.

The size of the flame of the pilot light may be controlled by a regulating screw 30 forming part of the fixture 27, while the maximum flow of gas to the burner may be controlled through regulating the cock 11 through a handle 11$^a$ with which it is provided. Moreover, the cock 11 may be entirely closed off if so desired during prolonged periods of inactivity of the press, or if it is desired to operate the press without heat.

Figure 5:
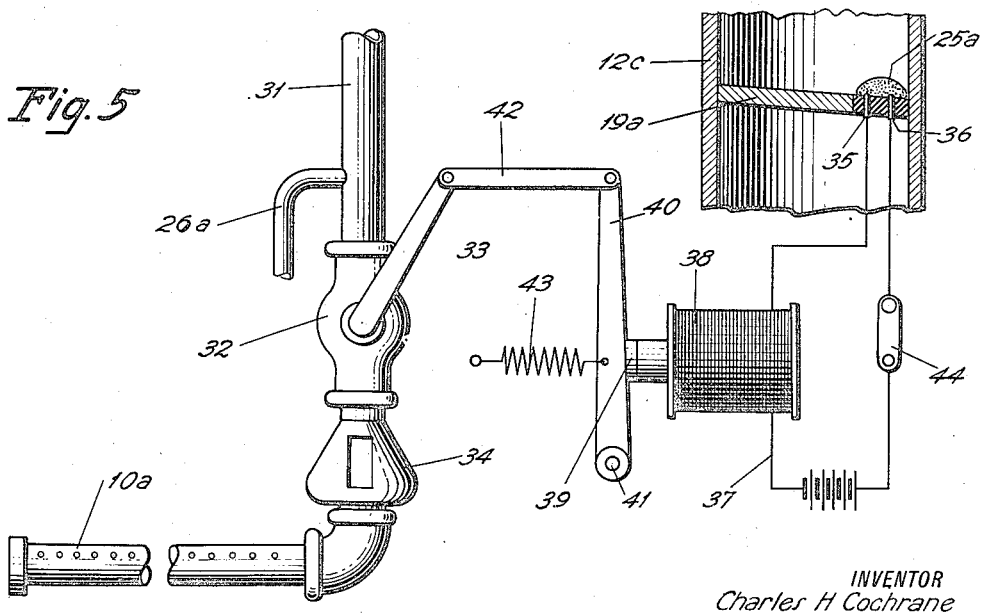
Figure 5 is a diagrammatic view illustrating a modified form of construction.

In the modified form of construction shown in Figure 5, the burner is designated 10$^a$ and is fed through a gas supply pipe 31, in which is included any suitable form of valve 32, shown for the purpose of illustration as an ordinary plug cock valve, having an operating handle 33. Between the valve 32 and the burner 10$^a$ is preferably interposed a mixing chamber 34 of any suitable kind which will deliver the proper mixture of gas and air to the burner 10$^a$. The pilot light is fed through a pilot tube 26$^a$, which branches from the gas supply pipe 31 above the valve 32, the construction of the discharge end of the pilot light being the same as that shown in Figure 1.

In this modified form of construction of the present invention, the flow of gas is controlled indirectly by a gravitating globular member and not directly by a spherical ball acting as a valve as in the preferred form of the invention. The globular member of the form of Figure 5 is preferably a globule of mercury 25$^a$ positioned above a partition 19$^a$ in a casing 12$^c$.

The partition 19$^a$ may be positioned horizontally as the partition 19, and hollowed out in the same manner, so as to provide a definite point of rest for the globule 25$^a$, but for the purpose of illustration here, we have shown the partition as slanting, the globule being adapted to come to rest at the base of the inclined upper face thereof. Mounted on that portion of the partition adjacent the base of the inclined face and in a position wherein they will be engaged by the mercury globule 25$^a$, when the same is at rest, are a pair of electrical contacts 35 and 36, which are included in an electrical circuit 37, also including an electromagnet 38.

The electromagnet 38 has an armature 39, which is mounted on an arm 40 pivoted at 41 and the free end of which arm is connected by a link 42 to the operating arm 33 of the valve 32. A spring 43 normally retracts the armature from the magnet and forces the arm 33 of the gas controlling valve into a position to open the valve, whereas, when the magnet 38 is energized, its armature is attracted for the purpose of drawing the operating arm 33 into a position to close the valve.

The operation of this modified form of construction will be apparent, but may be briefly described as follows.

The casing 12$^c$ is mounted on some vibratory portion of the press, with the result that when the press is operating the casing will be rapidly vibrated and the mercury globule 25$^a$ be caused to constantly shift its position after the manner described with reference to the spherical ball 25, so that the circuit 37 will be broken and the spring 43 will maintain the gas controlling valve open. The pilot light will have ignited the gas at the burner and heat will be supplied to the press. If the press stops, vibration will cease and the mercury globule 25$^a$ will gravitate to the bottom of the inclined face of the partition 19$^a$ and complete the circuit 37. As soon as the circuit is completed, the magnet 38 will be energized and through the connections described the gas controlling valve 32 will be closed, thereby extinguishing the burner, although leaving the pilot light lit.

I preferably include in the circuit 37 a switch 44 which is normally closed, but may be opened to save current, when the press is to remain inoperative for any appreciable period.

It will be understood that the specific invention described may be modified in formal respects, such as by the substitution of equivalents, and that parts of the complete mechanism described may be used alone, or in other environments, without departing from the spirit or substance of the broad invention, the scope of which is commensurate with the appended claims.

Having thus fully described the invention, what I claim as new and desire to secure by Letters Patent is:

1. Apparatus for controlling the flow of fluids embodying means controlled by the force of gravity when at rest and by vibratory movement imparted thereto when such movement is sufficient to overcome the force of gravity by which it is normally controlled.

2. Apparatus for controlling the flow of fluids embodying a mobile element normally maintained at rest by the force of gravity to effect a predetermined control of the flow of fluid and adapted, when vibration is imparted to said element, in a sufficient degree, to overcome the force of gravity, to be moved for the purpose of effecting a further predetermined control of the flow of fluid.

3. Apparatus for controlling the flow of fluids embodying a mobile element normally maintained at rest by the force of gravity for the purpose of arresting the flow of fluid and adapted, when vibration of sufficient strength to overcome the force of gravity is imparted thereto, to be moved for the purpose of permitting the flow of fluid.

4. Apparatus for controlling the flow of fluids embodying a supporting element adapted to be mounted on a machine to partake of the movement, vibration or oscillation of the machine, occasioned by the operation of the machine, a duct for feeding fluid to the machine, and a mobile element adapted, when the machine is at rest to arrest the flow of fluid through the duct, and when the machine is in motion to permit of the flow of fluid through the duct.

5. Apparatus for controlling the flow of fluids embodying a casing adapted to be mounted on a machine to partake of the movement, vibration or oscillation of the machine, occasioned by the operation of the machine, a mobile element positioned within the casing and operable by gravity when the machine is at rest to partake of a predetermined position, said member being operable during the operation of the machine to be displaced from such predetermined position, and means controlled by the position of the mobile element for feeding fluid adapted to pass through a duct associated with the machine.

6. Apparatus for controlling the flow of fluids embodying a closed chamber having an interior surface, different parts of which are inclined toward a common point in the surface, a mobile element positioned within the chamber and adapted to normally gravitate, by virtue of the inclined surface to the said common point therein, for the purpose of closing a duct leading through said surface, at this point, whereby fluid admitted to said chamber through an additional duct is precluded from passing therethrough, said mobile element being displaceable, when vibration is imparted to the closed chamber for the purpose of allowing of the exit of fluid.

7. Apparatus for controlling the flow of fluids embodying a closed chamber provided with inlet and outlet ports and the wall of which chamber is sloped to the outlet port, a ball in said chamber adapted to normally gravitate into a position to close the outlet port, but further adapted, when vibration is imparted to said closed chamber to be displaced from sealing relation with respect to the outlet port for the purpose of allowing fluid, fed into the chamber through the inlet port, to flow from the chamber through the outlet port.

Signed by me, at Chicago, Illinois, this 4th day of March, 1921.

CHARLES H. COCHRANE.

Witnesses:
SIMON NEWBERGER,
GEORGE R. SMITH.